United States Patent
Yan et al.

(10) Patent No.: US 10,788,411 B2
(45) Date of Patent: Sep. 29, 2020

(54) FLOW CYTOMETRY WITH DUAL LASER BEAMS

(71) Applicant: CYTEK BIOSCIENCES, INC., Fremont, CA (US)

(72) Inventors: Ming Yan, Pleasanton, CA (US); Eric Chase, Walnut Creek, CA (US); Yung-Chieh Hsieh, San Jose, CA (US)

(73) Assignee: Cytek Biosciences, Inc., Fremont, CA (US)

( * ) Notice: Subject to any disclaimer, the term of this patent is extended or adjusted under 35 U.S.C. 154(b) by 0 days.

(21) Appl. No.: 15/494,260

(22) Filed: Apr. 21, 2017

(65) Prior Publication Data

US 2017/0307503 A1 Oct. 26, 2017

Related U.S. Application Data

(60) Provisional application No. 62/325,988, filed on Apr. 21, 2016.

(51) Int. Cl.
*G01N 15/14* (2006.01)
*G02B 1/08* (2006.01)
(Continued)

(52) U.S. Cl.
CPC ..... *G01N 15/1434* (2013.01); *G01N 15/1459* (2013.01); *G02B 1/08* (2013.01);
(Continued)

(58) Field of Classification Search
CPC ....... G01N 15/1434; G01N 2015/0065; G01N 2015/1438; G01N 15/1459;
(Continued)

(56) References Cited

U.S. PATENT DOCUMENTS 5,134,426 A * 7/1992 Kataoka ............... G02B 27/283
250/336.1
6,097,485 A 8/2000 Lievan
(Continued)

FOREIGN PATENT DOCUMENTS

EP 1986044 A1 10/2008
WO WO2012055432 A1 5/2012
(Continued)

OTHER PUBLICATIONS

Thomas, Shane; International Search Report and Written Opinion; App. No. PCT/US2017/029724; dated Sep. 6, 2017; 16 pages.

*Primary Examiner* — Tri T Ton
(74) *Attorney, Agent, or Firm* — Alford Law Group, Inc.; Tobi C. Clinton; William E. Alford (57) ABSTRACT

A system, method, and apparatus are provided for cytometry with dual laser beams. In one example, the method includes directing an incident light beam from a source to enter an optical waveplate; polarizing the incident light beam into a polarized light beam in response to the incident light beam entering through the optical waveplate; directing the polarized light beam to enter a birefringent crystal; separating the polarized light beam into an ordinary light beam and an extraordinary light beam in response to the polarized light beam entering the birefringent crystal; directing the ordinary light beam and the extraordinary light beam to enter a lens; focusing the ordinary light beam and the extraordinary light beam into dual light beams separated by a beam displacement; and coupling the dual light beams to form a sample region having substantially uniform light intensity to analyze moving particles in the particle analyzer.

20 Claims, 8 Drawing Sheets

(51) Int. Cl.
*G02B 5/30* (2006.01)
*G02B 27/28* (2006.01)
*G01N 15/10* (2006.01)
*G01N 15/00* (2006.01)

(52) U.S. Cl.
CPC ......... *G02B 5/3083* (2013.01); *G02B 27/283* (2013.01); *G01N 2015/0065* (2013.01); *G01N 2015/1006* (2013.01); *G01N 2015/1438* (2013.01)

(58) Field of Classification Search
CPC .............. G01N 2015/1006; G02B 1/08; G02B 27/283; G02B 5/3083
USPC .................................................. 356/335–343
See application file for complete search history.

(56) References Cited

U.S. PATENT DOCUMENTS

| | | | |
|---|---|---|---|
| 6,366,354 B1 | 4/2002 | Chandler | |
| 6,510,007 B1 | 1/2003 | Blasenheim | |
| 7,440,101 B2 | 10/2008 | Auer et al. | |
| 7,709,821 B2 | 5/2010 | Casstevens et al. | |
| 8,454,813 B2 | 6/2013 | Voldman et al. | |
| 2006/0256335 A1* | 11/2006 | Chen .................... | G02B 5/3083 356/369 |

FOREIGN PATENT DOCUMENTS

| | | |
|---|---|---|
| WO | WO2014205007 A1 | 12/2014 |
| WO | WO2016057923 A1 | 4/2016 |

\* cited by examiner

FLOW CYTOMETRY WITH DUAL LASER BEAMS

CROSS REFERENCE TO RELATED APPLICATION

This patent application claims the benefit of U.S. Provisional Patent Application No. 62/325,988 entitled CYTOMETRY WITH DUAL LASER BEAMS filed on Apr. 21, 2016 by inventors Ming Yan et al.

FIELD

The embodiments of the invention relate generally to flow cytometry.

BACKGROUND

Flow cytometry is a technology that is used to analyze the physical and chemical characteristics of particles in a flow of a sample fluid as its passes through a laser light generated by a laser of a flow cytometer. Cell components can be fluorescently labeled and then excited by the laser so they emit light at varying wavelengths.

The fluorescence can be measured to determine various properties of single particles, which are usually cells (e.g., blood cells). Up to thousands of particles per second can be analyzed as they pass by the laser in a liquid stream. Examples of the properties measured include the particle's relative granularity, size and fluorescence intensity as well as its internal complexity. An optical-to-electronic coupling system of a flow cytometer is used to record the way in which the particle emits fluorescence and scatters incident beam from the laser.

The optical system of a flow cytometer includes a laser which illuminates the particles present in the stream of sample fluid. As the particles pass through the incident laser light from the laser, the laser light scatters. Furthermore, when excited by the laser light, any fluorescent molecules that are on the particle emit fluorescence which is detected by carefully positioned lenses and detectors. A flow cytometer collects data about each particle or event. The characteristics of those events or particles are determined based on their fluorescent and light scattering properties.

The electronics system of a flow cytometer is used to receive reflected and/or scattered light signals with one or more detectors and convert them into electronic pulses that represent data over time that a computer can process. The data can then be analyzed with the computer to ascertain information about a large number of biological cells over a short period of time.

BRIEF SUMMARY

The embodiments of the invention are summarized by the claims that follow below.

DETAILED DESCRIPTION

In the following detailed description of the embodiments of the invention, numerous specific details are set forth in order to provide a thorough understanding of the embodiments of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

The embodiments of the invention include a method, system, and apparatus for flow cytometry with dual laser beams.

General Overview

Figure 1:
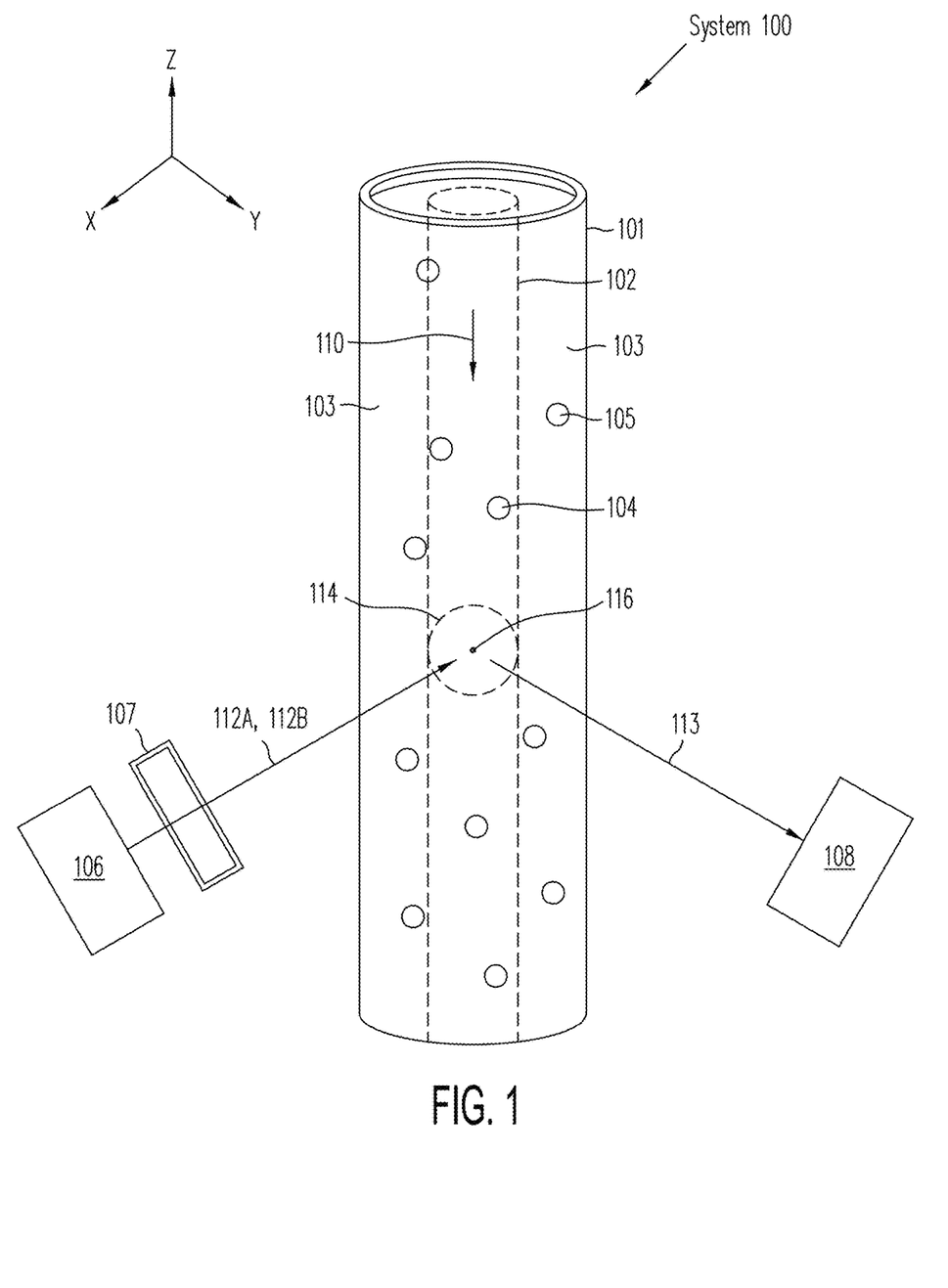
FIG. 1 is a schematic diagram of a flow cytometry system with dual laser beams.

FIG. 1 is a schematic diagram of a cytometry system 100 with dual laser beams 112A and 112B. The cytometry system 100 is a particle analyzer that includes a hollow cylindrical flow tube 101, a laser device 106, and one or more detector devices 108, among other devices. The laser device 106 is a light source that is coupled into optical elements 107. With a single laser beam from the laser device 106, the optical elements 107 form dual laser beams 112A and 112B that are directed at the flow tube 101. The one or more detector devices 108 includes optics and sensors for detecting reflected or scattered light 113 at various angles.

A sample fluid flow 102 in the center of the flow tube 101 is surrounded by a background fluid flow 103. The sample fluid flow 102 and the background fluid flow 103 flow together in a flow direction 110 through the flow tube 101. The sample fluid 102 may include, for example, particles 104 (e.g., blood cells, blood cell fragments, etc.) in an aqueous solution (e.g., plasma). The background fluid flow 103 surrounding the sample fluid flow 102 may be water and/or some other inert fluid. Occasionally, unwanted contaminant particles 105 may be found in the background fluid flow 103.

The dual laser beams 112A and 112B are focused on illuminating the particles 104 in the sample fluid flow 102 as they flow by in the flow tube 101. The dual laser beams 112A and 112B illuminate the sample fluid 102 at a sample region 114 (e.g., laser beam spot), including an interrogation spot 116. In design, the illuminated sample region 114 emits reflected and/or scattered light 113 from the interrogation spot 116 towards the one or more detector devices 108. Using the reflected and/or scattered light 113, the detector device 108 generates a signal that can be analyzed to determine the physical and/or chemical characteristics of the particles 104 as the sample fluid 102 with the particles passes through the sample region 114. Noise is generated when the detector generates a signal from detecting anything else other than the particles 104 in the sample fluid 102. For example, if the unwanted contaminant particles 105 found in the background fluid flow 103 are illuminated and detected; the detector generates noise in the signal.

Thus, it is desirable to illuminate the sample fluid flow 102 in the sample region 114 without illuminating other regions in the background fluid flow 103. Furthermore, it is desirable to illuminate the sample region 114 uniformly in the direction perpendicular to the sample flow direction 110 to minimize particle-to-particle signal variations caused by slightly different trajectories through the illumination region. Accordingly, the dual laser beams 112A and 112B, and the flow direction 110 are substantially perpendicular (e.g., ninety (90) degrees plus or minus five (5) degrees) to each other. Some of the light may be reflected and or scattered light may be reflected or scattered substantially perpendicular (ninety (90) degrees plus or minus (+/−) five (5) degrees) to the dual laser beams 112A. For example, assume the system 100 is situated in a three-dimensional (xyz) Cartesian coordinate system. The laser beams 112A and 112B may be directed along the x-axis; the reflected or scattered light 113 may be directed along the y-axis; and the flow direction 110 may be along the z-axis. The light may be reflected or scattered at other angles and detected by one or more detectors positioned along the optical axis of the reflected or scattered light angles.

Figure 2A:
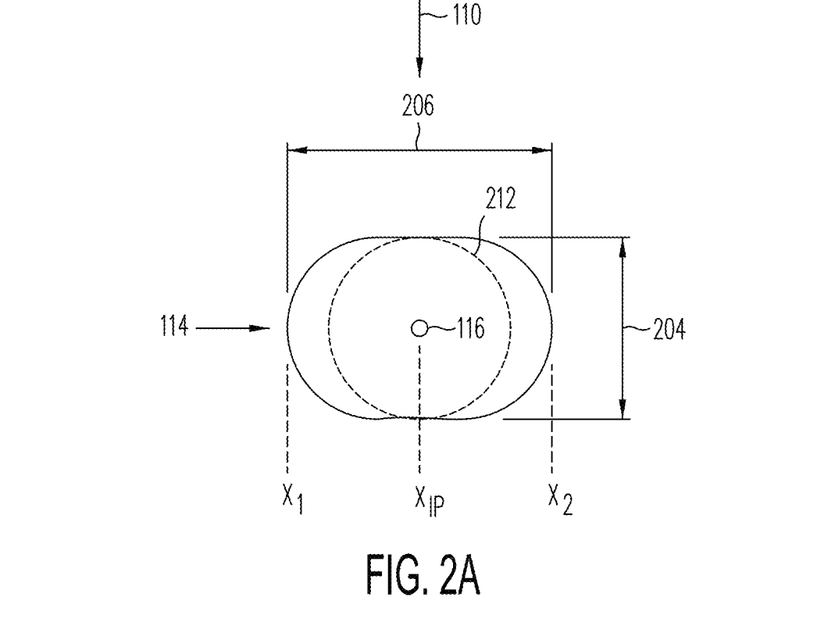
FIG. 2A is a schematic diagram of the sample region with a single laser beam spot relative to the particle flow direction.

FIG. 2A is a schematic diagram of the sample region 114, relative to the particle flow direction 110, having a single laser beam spot 212 of high intensity that can spread over the sample region 114. In the sample region 114, the laser beam spot 212 has a laser beam width 206 and a laser beam height 204. In this example, the laser beam width 206 is measured perpendicular (e.g., ninety degrees plus or minus five degrees) to the flow direction 110; while the laser beam(s) height 204 is measured parallel to the flow direction 110. The laser beam may emit energy outside of the sample region 114 which can result in additional noise. The effective laser beam width 206 is within the sample region 114 between points $X_1$ and $X_2$. The interrogation point $X_{IP}$ is typically midway between points $X_1$ and $X_2$. The intensity of the laser beam spot is typically the greatest around the interrogation point $X_{IP}$.

Ideally, the laser beam width 206 is greater than the laser beam height 204 to minimize particle to particle variations. Likewise, the laser beam height 204 is less than the laser beam width 206 to minimize coincidence between neighboring particles.

Figure 3A:
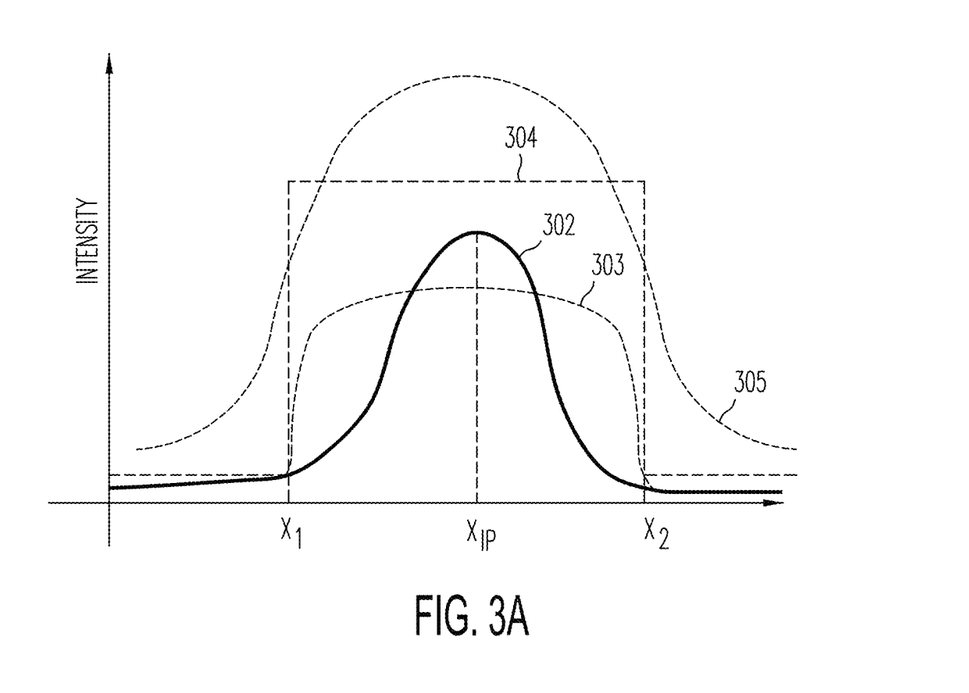
FIG. 3A is an example distribution of intensity of a single laser beam spot.

FIG. 3A is an example distribution of intensity (e.g., energy, density, etc.) of the single laser beam spot 212 in the sample region 114 formed by a single laser. The distribution of FIG. 3A shows the laser intensity (vertical axis) versus the position X (horizontal axis) within the laser beam spot. The intensity curve 302 of the laser beam spot has a Gaussian (or normal) profile. As described above with reference to FIG. 2A, the effective laser beam width is within the sample region between points $X_1$ and $X_2$. As shown by the intensity curve 302 in FIG. 3A, the laser beam emits some energy outside the points $X_1$ and $X_2$ of the sample region that can result in noise. The interrogation point $X_{IP}$ is about midway between points $X_1$ and $X_2$ of the sample region 114. The intensity of the laser beam spot is typically greatest around the interrogation point $X_{IP}$.

Spreading out the width of the laser beam spot with optical elements to increase the laser beam width 206 and smooth out the Gaussian profile typically decreases power density at the interrogation point $X_{IP}$ (e.g., interrogation point 116), such as shown by intensity curve 303. This in turn decreases the signal-to-noise ratio (SNR) at the detector 108. With reference to FIG. 1, the signal includes a detection of particles 104 in the sample fluid 102; while the noise includes a detection of anything other than particles 104 in the sample fluid 102, such as particle 105 in the background fluid flow 103 surrounding the sample fluid 102.

Alternatively, a more powerful laser may be used to provide a wider laser beam spot and greater signal energy within the sample region between points X1 and X2 to increase the signal energy that is detected by the detector such as shown by curve 305. However, this increases power consumption and heat generated by the laser that is undesirable. Moreover, with additional power, additional laser beam energy in the Gaussian profile resides outside the desired sample region between points $X_1$ and $X_2$. This will result in additional noise that reduces the signal to noise ratio.

Referring back to FIG. 3A, it is desirable to provide uniform horizontal illumination in the sample region 114 and thereby maintain high energy density. For example, it is desirable to have a laser profile that has a flat top 304, which has advantages over a normal Gaussian laser profile.

Several conventional approaches have been used to attempt to create a flat top 304 from a Gaussian laser profile 302. One of the simplest is apodization, where a neutral density filter with an inverse Gaussian transmission characteristic is used to flatten the laser profile. This approach has the disadvantage of energy loss, as well as the requirement that the filter be carefully aligned to the laser beam that is difficult to maintain. Another approach; such as disclosed in U.S. Pat. No. 8,259,396; utilizes diffractive optics which can be designed to generate a flat top profile. This approach has the disadvantage of optics being difficult to manufacture in low volume. A third approach disclosed in U.S. Pat. No. 8,451,524; scans the laser beam perpendicular to the sample flow, eliminating particle to particle variations created by different trajectories. The disadvantage to this approach is that it requires scanning optics, which can be expensive.

Dual Laser System with a Birefringent Crystal

The methods, apparatus, and system disclosed herein addresses shortcomings of conventional approaches by providing a dual laser beam. The dual laser beam is generated from a single laser light source using a birefringent crystal.

Figure 2B:
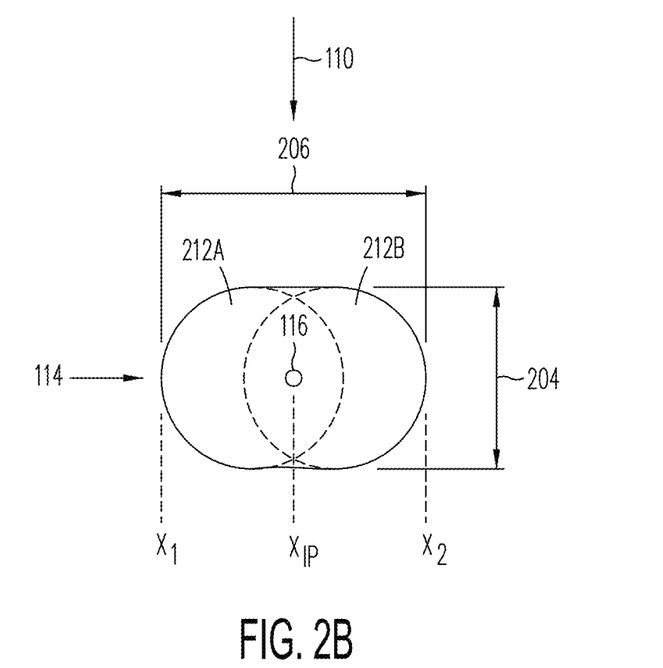
FIG. 2B is a schematic diagram of the sample region with a dual laser beam spot relative to the particle flow direction.

Referring now to FIG. 2B, a schematic diagram is illustrated, relative to the particle flow direction 110 of the sample region 114, with dual laser beams 112A-112B. In the sample region 114, the dual laser beams 112A-112B form laser beam spots 212A-212B that somewhat overlap around the interrogation point $X_{IP}$ 116. Together the dual laser beams 112A-112B generate a merged laser beam spot with a laser beam width 206 and a laser beam height 204. In this example, the laser beam width 206 is measured perpendicular (e.g., ninety degrees plus or minus five degrees) to the flow direction 110; while the laser beam height 204 is measured parallel (e.g., one hundred eighty degrees plus or minus five degrees) to the flow direction 110. The effective laser beam width 206 is within the sample region 114 between points $X_1$ and $X_2$.

Ideally, the laser beam width 206 is greater than the laser beam height 204 to minimize particle to particle variations. Likewise, the laser beam height 204 is ideally less than the laser beam width 206 to minimize coincidence between particles.

Figure 3B:
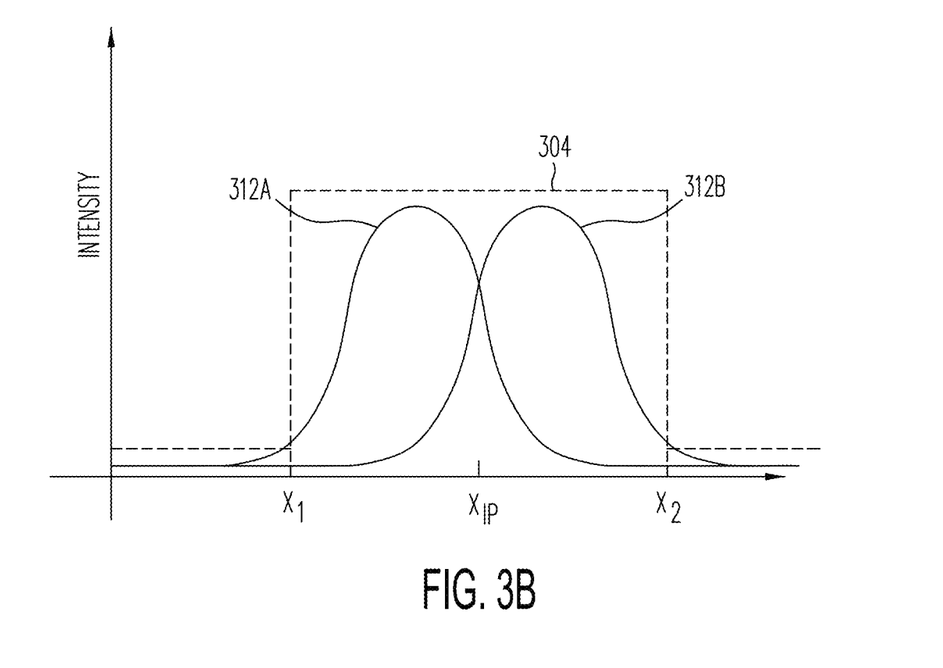
FIG. 3B is an example distribution of intensity of dual laser beam spots.

FIG. 3B is an example distribution of intensities (e.g., energy, density, etc.) 312A-312B respectively for the two laser beams 112A-112B in the sample region 114. Each distribution 312A-312B shows the laser intensity (vertical axis) versus the position X (horizontal axis) within the laser beam spot. Each intensity distribution 312A-312B of each laser beam has a Gaussian (or normal) profile. As described above with reference to FIG. 2B, the effective laser beam width is within the sample region between points $X_1$ and $X_2$. As shown in FIG. 3B, the dual laser beams emit little energy outside the points $X_1$ and $X_2$ of the sample region to minimize noise. If the intensity distributions 312A-312B of the dual laser beams are combined together, the combined distribution has a fairly flat top and a narrow band within the sample region that closely approximates the ideal flat top distribution 304.

Figure 4:
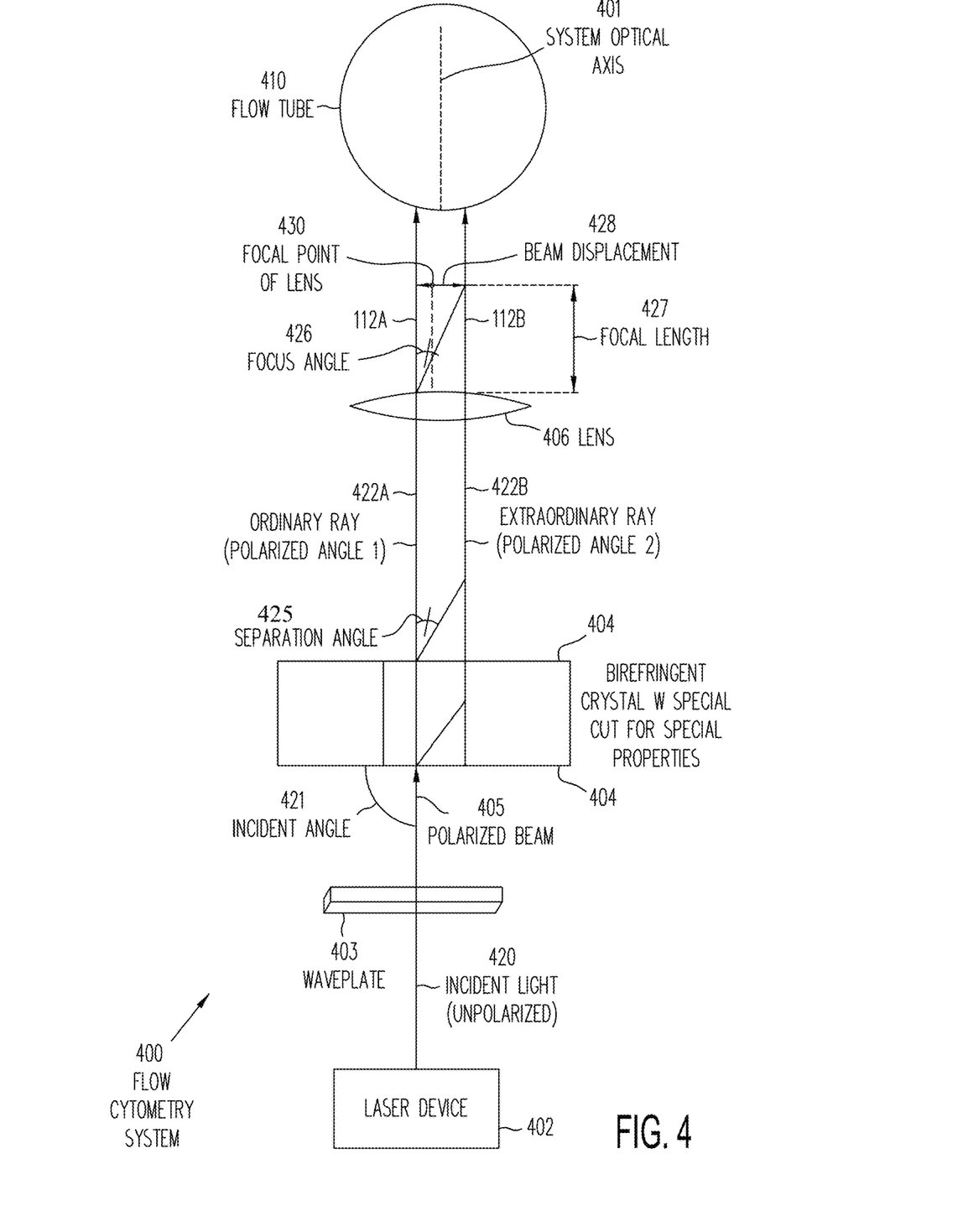
FIG. 4 is another schematic diagram of a cytometry system with dual laser beams.

Referring now to FIG. 4, a schematic diagram of a cytometry system 400 with dual laser beams 112A-112B is illustrated. The cytometry system 400 is a particular analyzer that includes a laser device 402, an optical waveplate 403, a birefringent crystal 404, a lens 406, and a flow tube 410, among other devices. The devices of the system 400 are aligned according to a system optical axis 401.

The laser device 402 emits an incident beam 420 that is unpolarized or has an original polarization for a single beam. The incident beam 420 is aligned according to the system optical axis 401. The incident beam 420 enters the optical waveplate 403. The waveplate 403 is an optical element (e.g., a polarizer) that polarizes the incident beam 420 to emit a polarized beam 405. The polarized beam 405 includes two components that have different polarization angles. The polarized beam 405 is aligned with the system optical axis 401.

The polarized beam 405 reaches the birefringent crystal 404 at an incident angle 421 relative to a face side of the birefringent crystal 404. The system 401 has a high tolerance for the incident angle 421. In one embodiment, the incident angle can be as much as ten degrees.

Advantages of the high tolerance for the incident angle 421 include at least the following: calibrating the positioning of the birefringent crystal 404 does not require extreme precision and is not an arduous task; the birefringent crystal 404 can be formed inexpensively to be within tolerances; and the manufacturing of the system 401 is less expensive overall due to the high tolerance for the incident angle 421.

The birefringent crystal 404 is a wedge-shaped optical element that separates the components of the polarized beam 405. Birefringent means the refractive index of a horizontal polarization is different than the refractive index of a vertical polarization, thereby splitting the direction angle of each beam component for each polarization. (Polarization is further described herein with reference to FIG. 5.) Accordingly, half of the polarized beam 405 propagates as an ordinary beam 422A; the other half of the polarized beam 405 propagates as an extraordinary beam 422B. The birefringent crystal 404 is cut such that the two beams 422A and 422B emerge at a separation angle 425 with respect to one another. The separation angle 425 is proportional to a crystal's refractive index for each polarization and the given refraction angle for each refractive index.

The polarized beams 422A and 422B reach the lens 406. The lens 406 focuses the two beams 422A and 422B to emit the dual beams 112A and 112B at a focus angle 426 relative to each other. At a focal point 430 of the lens 406, the dual beams 112A and 112B are displaced from one another by a beam displacement 428. In one embodiment, the beam displacement 428 is between four-tenths (4/10) and six-tenths (6/10) of a diameter of the incident beam 420. At the focal point 430, the beam displacement 428 may be approximated by the following equation, Equation 1:

Beam Displacement=Focal Length×tangent(Focus Angle)

The dual beams 112A and 112B reach the flow tube 410 and illuminate the sample region 114 in the flow cytometer shown in FIG. 1. In one embodiment, the birefringent crystal 404 is designed such that the ninety-seven percent (97%) power width of the two combined beams 112A and 112B is about four times (4×) the peak power width of a single beam (112A or 112B).

Figure 5:
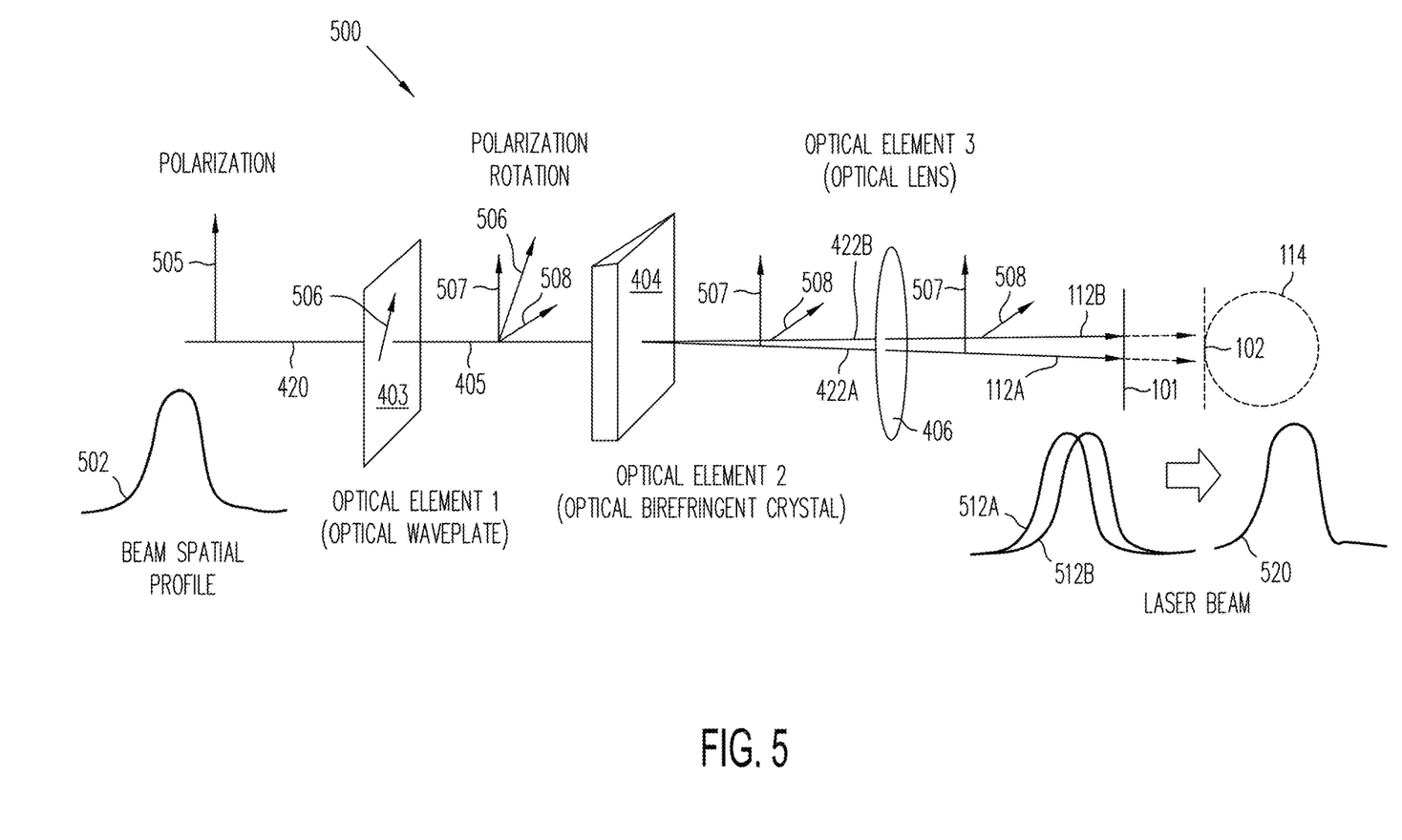
FIG. 5 is a conceptual diagram of a cytometry system with the dual laser beams.

Referring now to FIG. 5, conceptual diagram of a cytometry system 500 with the dual laser beams 112A and 112B is shown. The cytometry system 500 is provided at a different perspective in order to illustrate the polarization of the laser beams 112A and 112B and beam spatial profiles 502, 512A and 512B, 520.

The laser device 402 emits the incident beam 420 at an original polarization angle 505, which may be defined as zero degrees. The incident beam 420 has a beam spatial profile 502 having a normal Gaussian energy curve. A normal Gaussian energy curve tends to have a pointed profile at its peak upper limit. For example, a Gaussian energy curve tends to have a discernable maximum energy point at its peak.

The incident beam 420 enters the optical waveplate 403. The waveplate 403 is rotated to be orientated at a waveplate angle 506. In one embodiment, the waveplate angle 506 is about forty-five degrees plus or minus five degrees, relative to the original polarization angle 505. The waveplate angle 506 causes the waveplate 403 to emit the incident beam 420 as the polarized beam 405. The polarized beam 405 includes two components that have two different polarization angles, including a vertical angle 507 and a horizontal angle 508. For example, the vertical angle 507 may be about zero degrees relative to the original polarization angle 505; and the horizontal angle 508 may be about ninety degrees relative to the original polarization angle 505. The two components of the polarized beam 405 are about equal in magnitude (e.g., sine component and cosine component). The polarized beam 405 reaches the birefringent crystal 404 at an incident angle.

As shown in FIG. 5, the birefringent crystal 404 separates the components of the polarized beam 405. Birefringent means that the refractive index for a horizontal polarization is different than the refractive index for a vertical polarization. The different refractive indexes in the birefringent crystal 404 thereby split the direction angle of each beam component for each polarization. The birefringent crystal 404 is cut such that half of the polarized beam 405 propagates as the ordinary beam 422A; and the other half of the polarized beam 405 propagates as the extraordinary beam 422B. The ordinary beam 422A retains the vertical angle 507; the extraordinary beam 422B retains the horizontal angle 508. Accordingly, the two beams 422A and 422B emerge at a separation angle 425 with respect to one another as is shown in FIG. 4.

The two beams 422A and 422B are coupled into the lens 406. The lens 406 focuses the two incident laser beams 422A and 422B to emit the dual focused beams 112A and 112B. As shown in FIG. 4, the lens emits the dual beams 112A and 112B to form a single merged laser beam spot at the focal point in the sample region of the flow cytometer. In FIG. 5, the ordinary beam 112A retains the vertical angle 507; while the extraordinary beam 112B retains the horizontal angle 508. Considered individually, the ordinary beam 112A has a spatial energy profile 512A having a normal Gaussian curve; while the extraordinary beam 112B has a spatial energy profile 512B also having a normal Gaussian curve but with its peak spaced apart from the peak in the spatial energy profile 512A.

The optical elements in the flow cytometer system 500 superimposes the spatial energy profiles 512A and 512B of the respective beams 112A,112B together at the focal point of the lens 406 in the sample region of the flow cytometer. The superposition of the spatial energy profiles 512A and 512B forms a combined spatial energy profile 520 at the focal point of the lens. The combined spatial energy profile 520 of the dual laser beams has a relatively flat top, instead of a pointed top associated with the typical single laser beam spatial energy profile of a normal Gaussian curve. For example, the combined spatial profile 520 tends not to have a discernable maximum point, but rather tends to have a flat top with more even energy (e.g., intensity) in the sample region. In contrast, a normal Gaussian energy curve tends to have a discernable maximum point at a peak.

Figure 6A:
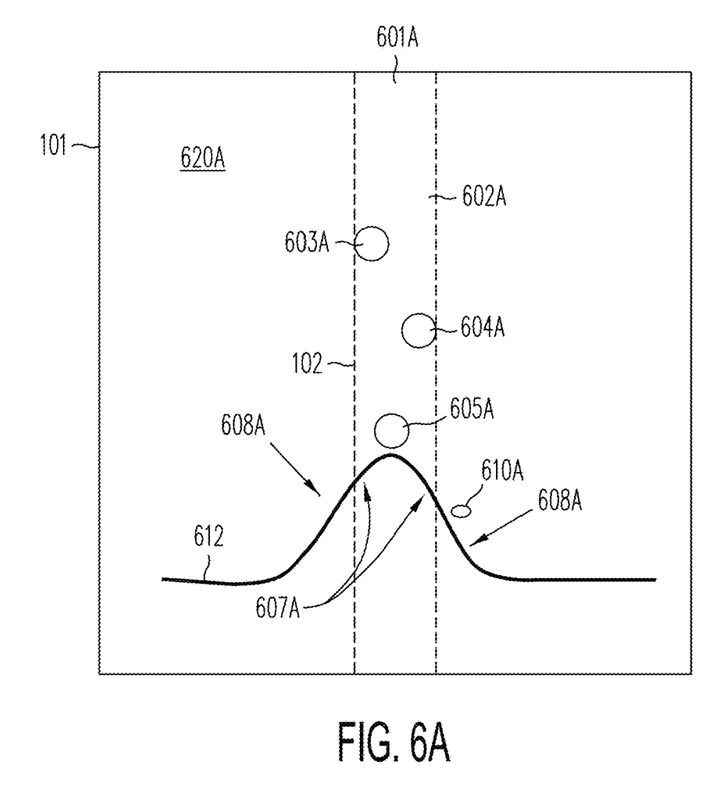
FIG. 6A illustrates a wide beam profile for a laser beam illuminating a sample fluid.

FIG. 6A illustrates a wide beam profile 612 (e.g., normal beam profile) for a laser beam illuminating a sample fluid stream 601A over a sample region, such as the sample region 114 shown in FIG. 1. The sample fluid 601A includes particles 603A, 604A, and 605A (e.g., blood cells, blood cell fragments, etc.) in an aqueous solution 602A (e.g., plasma). The sample fluid stream 601A may be surrounded by a background fluid stream 620A (e.g., water and/or some other fluid). A contaminant 610A may be suspended in the background fluid stream 620A outside of the sample fluid stream 601A.

The wide beam profile 612 has a normal Gaussian energy curve, but with much greater power and more widely spread out than the laser beam spatial profile 502 of FIG. 5 in order to cover the entire sample region in the sample fluid stream 601A. A normal Gaussian energy curve tends to be pointy or pointed (having a peak) at the upper limit and spreads out spatially. For example, a Gaussian energy curve tends to have a discernable maximum point at a peak that spreads out into decreasing side lobes.

The wide beam profile 612 has several disadvantages. The wide beam profile 612 indicates decreased illumination in different off center areas 607A of the sample fluid stream 601A due to the energy fall off in its side lobes from its peak. For example, such uneven illumination of the sample fluid stream 601A may cause a particle 605A to receive a higher reading because it undergoes a higher illumination near the center and peak; while other off center particles 603A and 604A may receive lower readings because they undergo lower illumination from the laser beam spot in a position of the lower energy of the wide beam profile profile 612.

The wide beam profile 612 also indicates increased illumination in background areas 608A outside the sample region that are in the background fluid stream 620A. Such increased illumination in the background areas 608A can increase noise by detecting a contaminant 610A in the background fluid stream 620A and thereby decrease the signal-to-noise ratio.

Figure 6B:
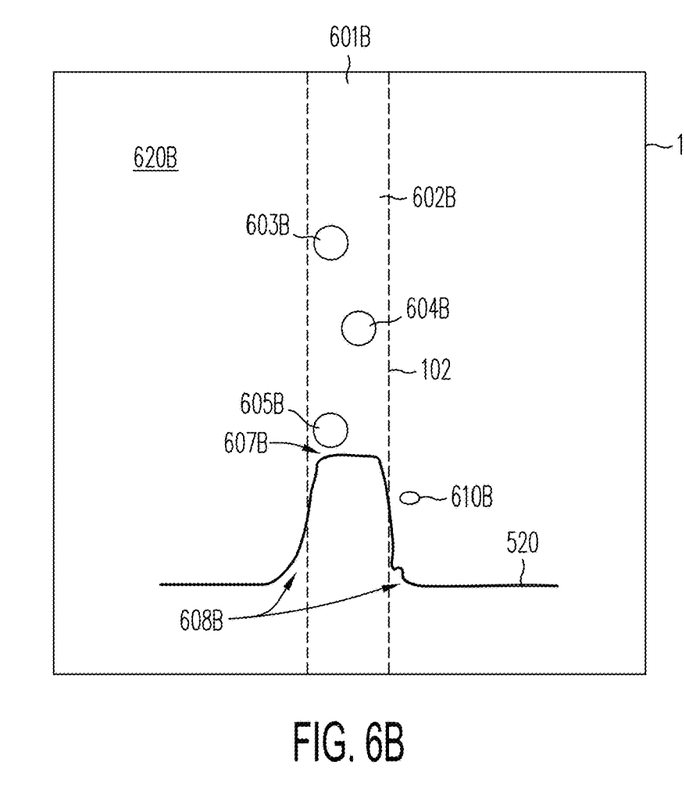
FIG. 6B illustrates a narrow beam profile for a focused dual laser beam illuminating a particle fluid.

FIG. 6B illustrates the combined spatial energy profile 520 (e.g., with a flat top beam profile 607B) for the focused dual laser beams illuminating a sample fluid stream 601B. The combined spatial energy profile 520 has more of its energy focused in a narrow spatial region associated with the sample region. The sample fluid stream 601B includes particles 603B, 604B and 605B (e.g., blood cells, blood cell fragments, etc.) in an aqueous solution 602B (e.g., plasma). The sample fluid stream 601B may be surrounded by a background fluid stream 620B (e.g., water and/or some other fluid). A contaminant 610B can be suspended in the background fluid stream 620B outside of the sample fluid stream 601B.

The combined spatial energy profile 520 is formed from adding the spatial profiles 512A and 512B for the respective laser beams 112A and 112B of FIG. 5 together. The combined spatial profile 520 has a relatively flat top 607B, instead of a pointed top of the typical laser profile, a normal Gaussian curve. Moreover, the relatively flat top 607B of the combined spatial profile 520 is within a narrow spatial region covering the sample region providing a narrower beam profile than that of the wide beam profile 612.

A flat top and narrow beam profile of the combined spatial energy profile 520 has several advantages. The flat top and narrow beam profile of the combined spatial energy profile 520 provides a relatively even illumination of the sample fluid stream 601B in the sample region. Such even illumination (e.g., constant power density) causes particles 603B, 604B, and 605B at different points in the sample fluid stream to receive relatively fair readings. The flat top and narrow beam profile of the combined spatial energy profile 520 enables the use of a lower powered laser for the same power density more focused on the sample region and the sample stream 601B, when compared to the power density of the wide beam profile 612 focused on the sample stream 601A of FIG. 6A.

In FIG. 6B, the narrow beam profile in the combined spatial energy profile 520 also indicates reduced illumination of background areas 608B outside the sample region and in the background fluid stream. Such decreased illumination in the background areas decreases the noise that may be detected, such as from a contaminant 610B, thereby increasing the signal-to-noise ratio.

Figure 7:
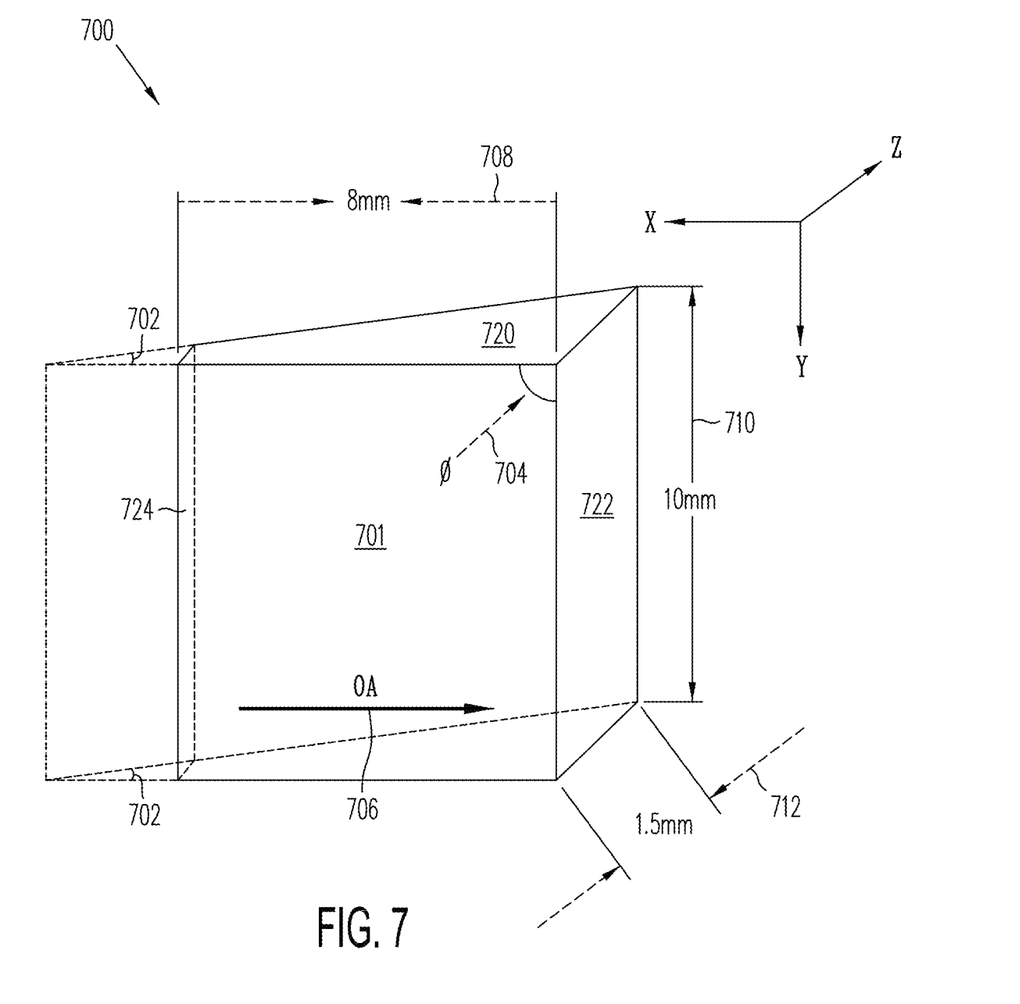
FIG. 7 is a schematic diagram of an example birefringent crystal.

FIG. 7 is a schematic diagram of an example of a three dimensional birefringent crystal 700 in the shape of a truncated wedge that may be used for the birefringent crystal 404 shown in FIGS. 4-5. The birefringent crystal 700 includes at least a face side 701, a wedge side 720, and a major side 722, which are substantially perpendicular (90 degrees+/−5 degrees) to each other. For example, assume the birefringent crystal 700 is situated in a three-dimensional (xyz) Cartesian coordinate system. The face side 701 may be in the x-y plane; the major side 722 may be in the y-z plane; and the wedge side 720 may be in the x-z plane. The birefringent crystal 700 being three dimensional includes a parallel wedge side 720.

As shown in FIG. 7, the triangle forming the wedge side 720 and the parallel wedge side may be truncated thereby forming a side 724 parallel to major side 722 and perpendicular face side 701 as shown. The truncated wedge side 720 forms a truncated wedge shape, a hexahedron, for the three dimensional birefringent crystal 700 to conserve space. A wedge angle 702 is associated with the wedge side 720 and the triangle forming the wedge side. As shown in FIGS. 4-5, the incident polarized light beam 405 is coupled into the birefringent crystal 700 at an incident angle (e.g., angle 421 shown in FIG. 4) with the optical axis (OA) 706 of the birefringent crystal.

In this example, the birefringent crystal 700 can include the following specifications:

a material composition that is transparent to light and includes a quartz mineral;

a wedge angle 702 associated with the wedge side 720 of about 2.0 degrees plus or minus (+/−) one tenth (0.1) of a degree;

a face angle 704 on the face side 701 of about 90.0 degrees+/−0.1 of a degree;

a width 708 of the face side 701 of about 8.0 millimeters (mm)+/−0.1 mm;

a height 710 of the face side 701 of about 10.0 mm+/−0.1 mm;

a thickness 712 of the major side 722 of about 1.5 mm+/−0.1 mm;

an optical axis 706 along the width 708 having an error less than (<) one tenth (0.1) of a degree; and an antireflective AR coating of between about 400 nanometers (nm) and 650 nm.

The specifications for the birefringent crystal 700 are provided for explanatory purposes. Different and/or additional specifications are still within the scope of the embodiments of the invention.

Method Overview

Figure 8:
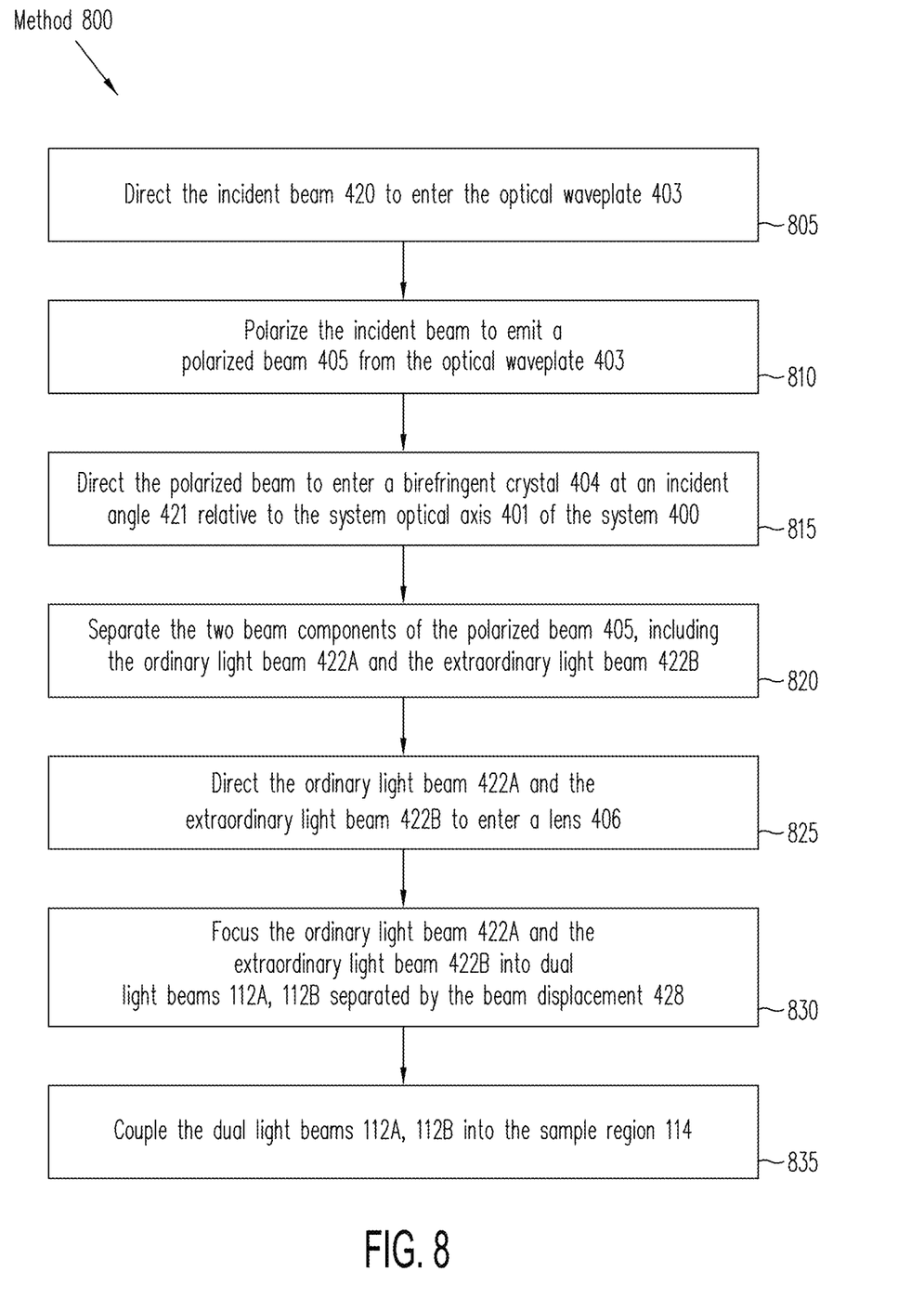
FIG. 8 is a flow chart of an example method for analyzing moving particles in a cytometry system.

Referring now to FIG. 8, a flow chart of an example method 800 for analyzing moving particles in a particle analyzer (e.g., cytometry system) is shown and now described. In one embodiment, the cytometry system 400 of FIG. 4 can carry out the example method 800.

At action 805 of the example method 800, the laser device 402 directs the incident beam 420 to enter the optical waveplate 403.

At action 810, the optical waveplate 403 polarizes the incident beam 420 to emit a polarized beam 405 from the optical waveplate 403. The polarized beam 405 is aligned with the system optical axis 401.

At action 815, the optical wave plate 403 directs the polarized beam 405 to enter a birefringent crystal 404 at an incident angle 421 relative to the system optical axis 401 of the system 400.

At action 820, in response to the polarized beam 405 entering the birefringent crystal 404, the birefringent crystal 404 separates the two beam components of the polarized beam 405. The two beam components include an ordinary light beam 422A and an extraordinary light beam 422B. The birefringent crystal 404 is cut such that the two beams 422A and 422B emerge at a separation angle 425 with respect to one another.

Act action 825, the birefringent crystal 404 directs the ordinary light beam 422A and the extraordinary light beam 422B to enter a lens 406.

At action 830, the lens 406 focuses the ordinary light beam 422A and the extraordinary light beam 422B into dual light beams 112A and 112B separated by the beam displacement 428.

At action 835, the lens 406 couples the dual light beams 112A and 112B into the sample region 114 (e.g., light beam spot). The sample region 114 has substantially uniform light intensity from the combined dual light beams to analyze moving particles in the particle analyzer.

Other actions and/or details are discussed with reference to other figures and may be a part of the method 800, depending upon the implementation.

CONCLUSION

The embodiments of the invention are thus described. While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

While this specification includes many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations, separately or in sub-combination. Moreover, although features may be described above as acting in certain combinations and even initially claimed as such, one or more features from a claimed combination may in some cases be excised from the combination, and the claimed combination may be directed to a sub-combination or variations of a sub-combination. Accordingly, the claimed invention is limited only by patented claims that follow below.

What is claimed is:

1. A method for analyzing moving particles in a particle analyzer, the method comprising:
    directing an incident light beam from a source to enter an optical waveplate;
    with the optical waveplate, polarizing the incident light beam into a polarized light beam, wherein the polarized light beam includes two components that have different polarization angles;
    directing the polarized light beam to enter a birefringent crystal;
    with the birefringent crystal, separating the polarized light beam into an ordinary light beam and an extraordinary light beam;
    directing the ordinary light beam and the extraordinary light beam to enter a lens; and
    with the lens, focusing the ordinary light beam and the extraordinary light beam into dual light beams separated by a beam displacement, wherein the beam displacement of the dual light beams at a focal point of the lens is between four-tenths and six-tenths of a diameter of the incident light beam.

2. The method of claim 1, further comprising:
coupling the dual light beams to form a sample region having substantially uniform light intensity to analyze moving particles in the particle analyzer.

3. The method of claim 1, wherein
the birefringent crystal has a material composition that includes quartz.

4. The method of claim 1, wherein
ninety-seven percent of a power diameter of a light beam spot of the dual light beams at the focal point of the lens is four times the power diameter of the incident light beam.

5. The method of claim 1, wherein
the particle analyzer includes a cytometry system; and
the incident light beam includes a laser beam.

6. The method of claim 1, wherein
the optical waveplate is orientated at about a forty-five degree angle relative to an original polarization angle of the incident beam.

7. The method of claim 1, wherein
the polarized beam enters the birefringent crystal at an incident angle relative to a face of the birefringent crystal.

8. The method of claim 1, wherein
the ordinary light beam and the extraordinary beam are separated by a separation angle at the birefringent crystal; and the dual light beams are separated by a focus angle at the lens.

9. A system for analyzing moving particles, the system comprising:
a laser device to emit an incident light beam;
an optical waveplate to receive and polarize the incident light beam into a polarized light beam, wherein the polarized light beam includes two components that have different polarization angles;
a birefringent crystal to receive and separate the polarized light beam into an ordinary beam and an extraordinary beam; and
a lens to receive and focus the ordinary light beam and the extraordinary light beam into a beam spot including overlapping dual light beams with optical axes separated by a beam displacement, wherein the beam displacement of the dual light beams at the focal point of the lens is between four-tenths and six-tenths of a diameter of the incident light beam.

10. The system of claim 9, further comprising:
a flow tube having the moving particles in a sample flow, wherein the lens is further configured to couple the dual light beams to form the beam spot in a sample region of the flow tube with substantially uniform light intensity to analyze the moving particles in the sample flow.

11. The system of claim 9, wherein the system is at least one of:
a particle analyzer; or
a cytometry system.

12. The system of claim 9, wherein
the birefringent crystal has a material composition that includes quartz.

13. The system of claim 9, wherein
ninety-seven percent of a power diameter of a light beam spot of the dual light beams at the focal point of the lens is four times the power diameter of the incident light beam.

14. The system of claim 9, wherein
the incident light beam includes a laser beam.

15. The system of claim 9, wherein
the optical waveplate is orientated at about a forty-five degree angle relative to an original polarization angle of the incident beam.

16. The system of claim 9, wherein
the polarized beam enters the birefringent crystal at an incident angle relative to a face of the birefringent crystal.

17. The system of claim 9, wherein
the ordinary light beam and the extraordinary beam are separated by a separation angle at the birefringent crystal; and
the dual light beams are separated by a focus angle at the lens.

18. The system of claim 12 wherein the birefringent crystal includes
a face side including a face angle of ninety degrees plus or minus one tenth of a degree;
a wedge side that is substantially perpendicular to the face side, wherein the wedge side includes a wedge angle of two degrees plus or minus one tenth of a degree; and
a major side that is substantially perpendicular to the face side and the wedge side; wherein the major side includes a thickness of one and one-half millimeter plus or minus one tenth of a millimeter;
wherein a polarized light beam entering the birefringent crystal at an incident angle is separated into an ordinary light beam and an extraordinary light beam.

19. The system of claim 18, wherein
the birefringent crystal includes an antireflective AR coating around the material composition.

20. The system of claim 18, wherein
the birefringent crystal is a hexahedron with a truncated triangle forming the wedge side.

* * * * *